United States Patent [19]

Bert

[11] Patent Number: 5,006,357
[45] Date of Patent: Apr. 9, 1991

[54] PACKAGING OF ROUGHAGE MATERIAL

[76] Inventor: Carlton R. Bert, P.O. Box 130, Larned, Kans. 67550

[21] Appl. No.: 360,359

[22] Filed: Jun. 2, 1989

Related U.S. Application Data

[63] Continuation of Ser. No. 155,557, Feb. 12, 1988, abandoned.

[51] Int. Cl.⁵ .................................................. A23K 1/00
[52] U.S. Cl. ..................................... 426/413; 426/410; 426/414; 426/518; 426/519; 426/532; 426/636; 426/658; 426/807
[58] Field of Search ............... 426/658, 636, 105, 410, 426/413–414, 419, 454, 807, 335, 532; 53/435, 438, 440, 529; 241/80

[56] References Cited

U.S. PATENT DOCUMENTS

| | | |
|---|---|---|
| 1,186,391 | 6/1916 | Gary . |
| 2,071,309 | 2/1937 | Gammeter . |
| 3,684,520 | 8/1972 | Bickoff . |
| 3,889,884 | 6/1975 | Morse .................................. 241/80 |
| 3,937,845 | 2/1976 | Han . |
| 4,015,018 | 3/1977 | Glabe . |
| 4,034,117 | 7/1977 | Glabe . |
| 4,201,128 | 5/1980 | Whitehead ........................... 50/529 |

FOREIGN PATENT DOCUMENTS

| | | |
|---|---|---|
| 592617 | 2/1960 | Canada . |
| 81310 | 12/1971 | German Democratic Rep. ..................................... 426/807 |

*Primary Examiner*—R. B. Penland
*Attorney, Agent, or Firm*—Dean P. Edmundson

[57] ABSTRACT

A process is described for drying and packaging moisture-sensitive materials such as roughages and other feedstuffs for animals. The process involves producing particles, drying the particles, cooling the particles, and then compressing them into a container or package. The package can be sealed to keep out moisture. Preservatives, molasses, or other additives may be included with the particles before packaging. The types of feedstuff or other material which is processed and packed may vary. Blends of particles can also be packaged.

11 Claims, 6 Drawing Sheets

PACKAGING OF ROUGHAGE MATERIAL

CROSS REFERENCE TO RELATED APPLICATION

This application is a continuation of my copending application Ser. No. 155,557, filed Feb. 12, 1988 now abandoned.

FIELD OF THE INVENTION

This invention relates to processing of forage or roughage products such as alfalfa, grass, clover, or the like. More particularly this invention relates to techniques for processing and packaging of such forage or roughage products for later use in feeding animals. In another respect, this invention relates to processing and packaging of other roughage products and other moisture-sensitive products.

BACKGROUND OF THE INVENTION

Conventionally, forage crops such as hay (e.g., alfalfa, grass, clover, mixtures thereof, and the like) have been cut or severed from the main stem slightly above ground level and then left in the field for a few days to dry in the sun to a moisture level of about 15-20%. Then the dried hay is typically baled in the field and tied with twine or wire to produce bales weighing 50-100 pounds for small bales and up to a ton or more for large bales. The length of the individual stems of hay may be as long as 15-20 inches (depending upon the height of the hay when it was cut in the field).

Drying of the hay in the field is totally dependent upon weather conditions. If there is high humidity in the air when the hay is laying on the ground it will dry only very slowly. Also, if there is rain or drizzle while the hay is on the ground the amount of time required for drying the hay will naturally be increased. If there is too much rain or too much moisture present in the hay, then the hay could become spoiled while it is laying on the ground. Even if the hay doesn't become spoiled while laying on the ground, it could lose some of its protein value before it can be baled.

If the hay is not sufficiently dried before it is baled it will likely spoil in the bale because air is not able to penetrate the bale. The density of hay in a typical bale may be about 15 pounds per cubic foot. Also, when too much moisture is present in the bale, there is a very real danger of the heat of fermentation starting the hay on fire.

On the other hand, the more the hay is dried in the field the greater is the tendency for the leaves to fall off the stem when the hay is handled. This is extremely undesirable because of the relatively high food value in the leaves as compared to the food value of the stem. Also, if the hay is left in the field too long, it can become bleached by the sun. Thus, much luck and a good deal of care are required in order to cut and bale hay such as alfalfa in the field and obtain the highest quality product which does not spoil during storage.

An alternative manner of handling forage crops is to chop them green and place them into an airtight structure while they still contain high moisture. This causes the forage crop to ferment and form silage after a few days. Such a procedure may be useful in some instances for producing a suitable feed for certain animals (e.g., cattle) but it is not suitable for other types of livestock such as horses, pigs, sheep, etc. Also, this manner of storing the product requires large permanent storage structures at fixed locations. Consequently, there are numerous limitations and disadvantages associated with this type of storage and handling.

More recently there has been proposed the use of hay cubes which are typically about 1-2 inches square in cross-section. The hay is forced through square or rectangular dies which are about 1-2 inches by 1-2 inches and the extruded product is cut to a length of about 2-4 inches or so by a large knife. The hay must contain a certain amount of moisture in order for it to stick together in a cube form after it is cut by the knife. If too much moisture is present the cubed product may spoil. On the other hand, if there is too little moisture present the cube will break or fall apart.

The cubed hay product may be packaged in large sacks or handled in bulk form. Unfortunately, the cubes attract and absorb moisture easily in high humidity environments and then can spoil. As a result, this type of product has met with limited success.

Yet another previously known concept is the making of small pellets of hay (such as alfalfa). However, in making the pellets the roughage characteristics of the product are reduced and palatability is also reduced. Thus, a different type of feed is obtained as compared to the original material. Normally it is not fed directly to animals. Rather, it must be blended with other feeds before being fed to animals.

There has not heretofore been provided a technique for handling and packaging forage and roughage products in a manner which has overcome the problems and limitations associated with the prior conventional techniques. Also, there has not heretofore been provided a simple and convenient packaging technique for other moisture-sensitive feed products.

SUMMARY OF THE PRESENT INVENTION

In accordance with the present invention there is provided, in one embodiment, a process for handling and packaging of hay and other roughage (e.g., alfalfa, clover, grasses, etc.) in a manner such that the product is prevented from spoiling during shipment and storage. It is preserved so that the package can be shipped to any desired location and can also be stored for indefinite periods of time without loss of nutritional value and without spoilage.

The process of the invention, in one embodiment, comprises:
   (a) cutting (or chopping or shredding) the hay or other roughage to produce particles;
   (b) drying the particles to reduce its moisture content below about 12%;
   (c) cooling the particles to about room temperature or below;
   (d) packing the particles into a container; and
   (e) closing the container.

The container may be, for example, a plastic bag or other such package which can be air impervious. The size of the container may vary (e.g., it may be about 12 inches × 12 inches × 12 inches or as large as 2 feet by 2 feet by 4 feet or even larger).

The dried and packaged product of this invention preserves the hay or other roughage in its natural form which is very much like conventionally baled hay or roughage except that the particle size is smaller. By drying the hay or roughage in the manner described herein, the product has a uniform moisture level which is almost unattainable in conventionally baled hay.

The sealed package of the invention holds the product and maintains a constant moisture level so that the product does not dry out or absorb moisture. This prevents spoilage during shipment and storage. Also, the product can be safely packed at a density which is 40-50% greater than present in conventional baled hay.

The process of this invention is very beneficial in that the hay can be cut and processed in a manner such that the leaves remain on the stems and are not lost. The leaves contain much of the nutritional value of hay such as alfalfa. Therefore, it is very desirable to process the hay in a manner such that the leaves stay on the stem.

In conventional baling of hay it is necessary for the moisture content to be as low as 15-20%. However, at this level the leaves can be very easily dislodged from the stem. As a result, the baled hay can be lower in nutritional value than hay which retains all of its leaves.

In the present invention the hay can be cut or chopped to form particles while the hay has a moisture content of 25-50%. The leaves accordingly remain on the stem in the field. The particles are then dried, cooled, and immediately packaged at a processing facility. As a result, the leaves are contained in the package and are either on the stem or are uniformly mixed with the stems in the package. Consequently, the nutritional value of the packaged product is maintained at a high level. Furthermore, the packaged hay retains the palatability which is desired for hay. As a result, animals eat the packaged hay without hesitation.

In another aspect the present invention provides packaging techniques for other types of feedstuffs which are moisture-sensitive. For example, the present invention provides packaging techniques for ground, chopped, or comminuted feed such as corn, grain, hay, minerals, supplements, etc. Such materials can be fixed and blended in any desired ratio to obtain a feed mix which is tailored for a particular type of animal (e.g., feeder calves, pigs, sheep, poultry, rabbits, etc.). When the feed mix is packaged in a sealed container such as a plastic bag, the feed mix can be prepared and packaged at a factory and then shipped to any desired location and stored until it is needed. At the time of use, the feed mix can be fed to the animals as a complete diet, without the need for additional components and without the need for special equipment such as grinders and processors.

Other advantages of the processing and packaging techniques of this invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
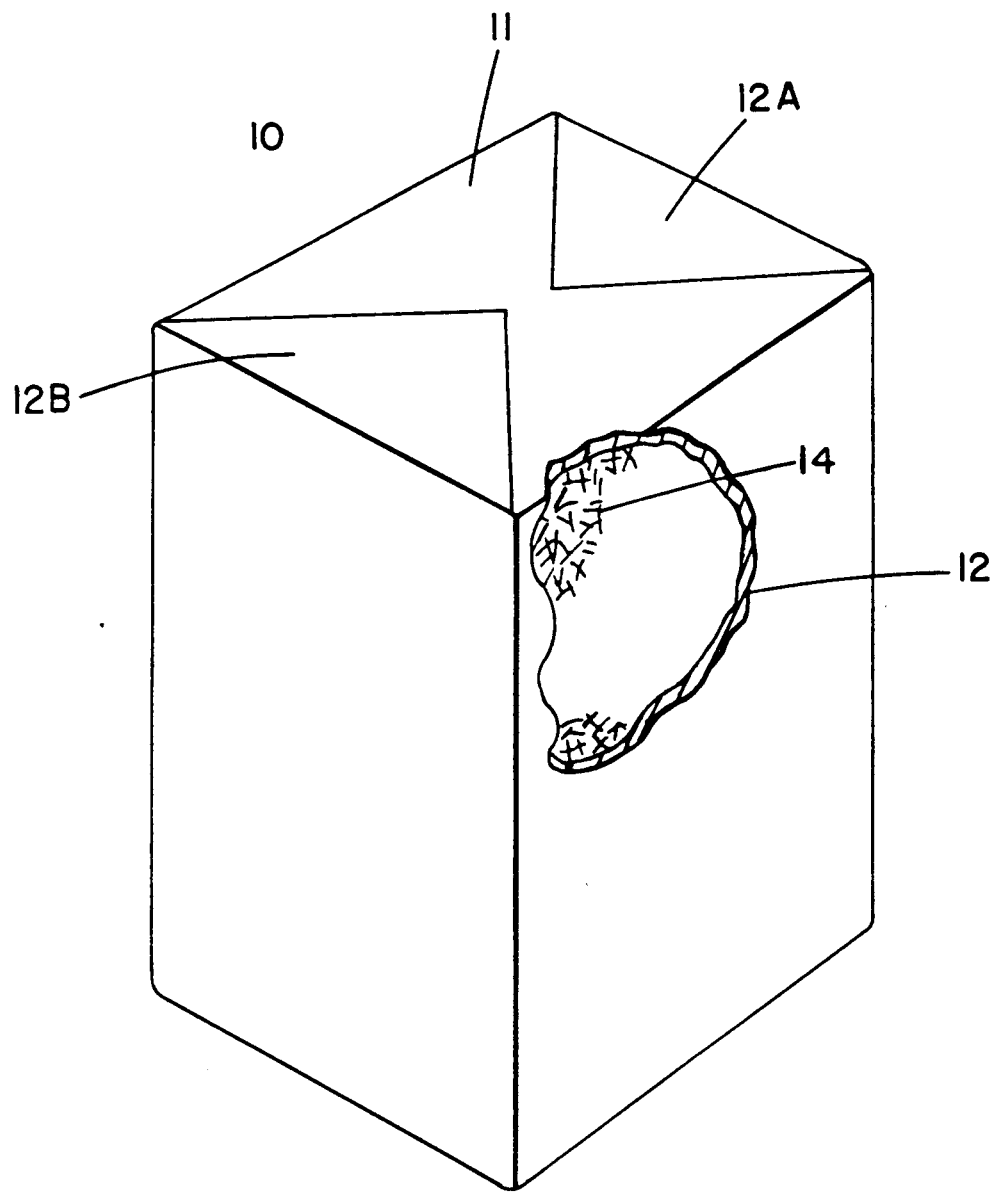
FIG. 1 is a partial cut-away perspective view of one embodiment of a package containing a roughage product in accordance with this invention.

In FIG. 1 there is illustrated a preferred embodiment of packaged product 10 of the invention. The package 10 comprises a container 12 in which there is contained a compressed product 14.

In this embodiment the container 12 comprises a plastic bag which is impervious to air. After the product 14 is placed within the bag, the upper end 11 of the bag is closed. Flaps 12A and 12B are folded towards each other and sealed to top 11 by means of a heated platen which heats the plastic sufficiently to cause portions of the flaps to soften and become tacky so that they become adhered to the top 11 of the package.

The size of the package 10 may vary, as desired. A convenient size is 12 inches by 15 inches by 24 inches. The package may be larger or smaller. When the package is of the size just stated, and when it is packed with dried product at a density of 18-22 pounds per cubic foot, the package weighs about 50-60 pounds. This is a convenient size for manual handling.

When the package is about 24 inches by 26 inches by 48 as much as 500-600 pounds, depending inches it can weigh upon the packing density of the product as well as the weight of the product.

The type of product 14 which may be packaged in accordance with this invention may also vary. In one aspect of the invention the product is roughage or hay. For example, the techniques described herein are especially useful for processing and packaging alfalfa, clover, grasses, and the like. The techniques of this invention are also useful for processing and packaging other types of roughage also, e.g., straw. The product is cut, chopped, or shredded before being further processed as described in detail hereafter.

In yet another aspect the techniques of the invention are also useful in connection with the packaging of nonfibrous feedstuffs such as ground grains, wheat midds (hulls and by-products resulting from milling of wheat to remove the germ), and the like.

A material is to be packaged (e.g., alfalfa, clover, grass, etc.) is first cut in the field. The growing crop is very high in moisture (e.g., 65-80% by weight). After it is cut it is desirable to let it dry slightly (e.g., to a moisture content of about 20-50%, and preferably 25-35%) in the field. Then the material can be cut or chopped with a forage harvester to particles having a length less than about 6 inches long (preferably less than about 3 inches). Of course, there will normally be a variety of particle sizes resulting from the chopping.

It is very desirable to cut or chop the forage when the moisture content is at least 20% because the leaves (e.g., on alfalfa stems) are more likely to remain attached to the plant at this level as compared to plants which have dried to a lower moisture content. Thus, by chopping the forage with a relatively high moisture content the leaves are not lost in the field. The nutritional value of the leaves is a major part of the total nutritional value of plants such as alfalfa.

After the forage crop has been cut or chopped to the desired particle size it is dried in a conventional dryer (e.g., a rotating drum dryer through which heated air is forced). The particles should be dried to a moisture content of less than about 12%. Then the particles must be cooled to approximately room temperature or below. Then the particles may be compressed and packaged in a container such as a plastic bag which is air impervious.

Figure 2:
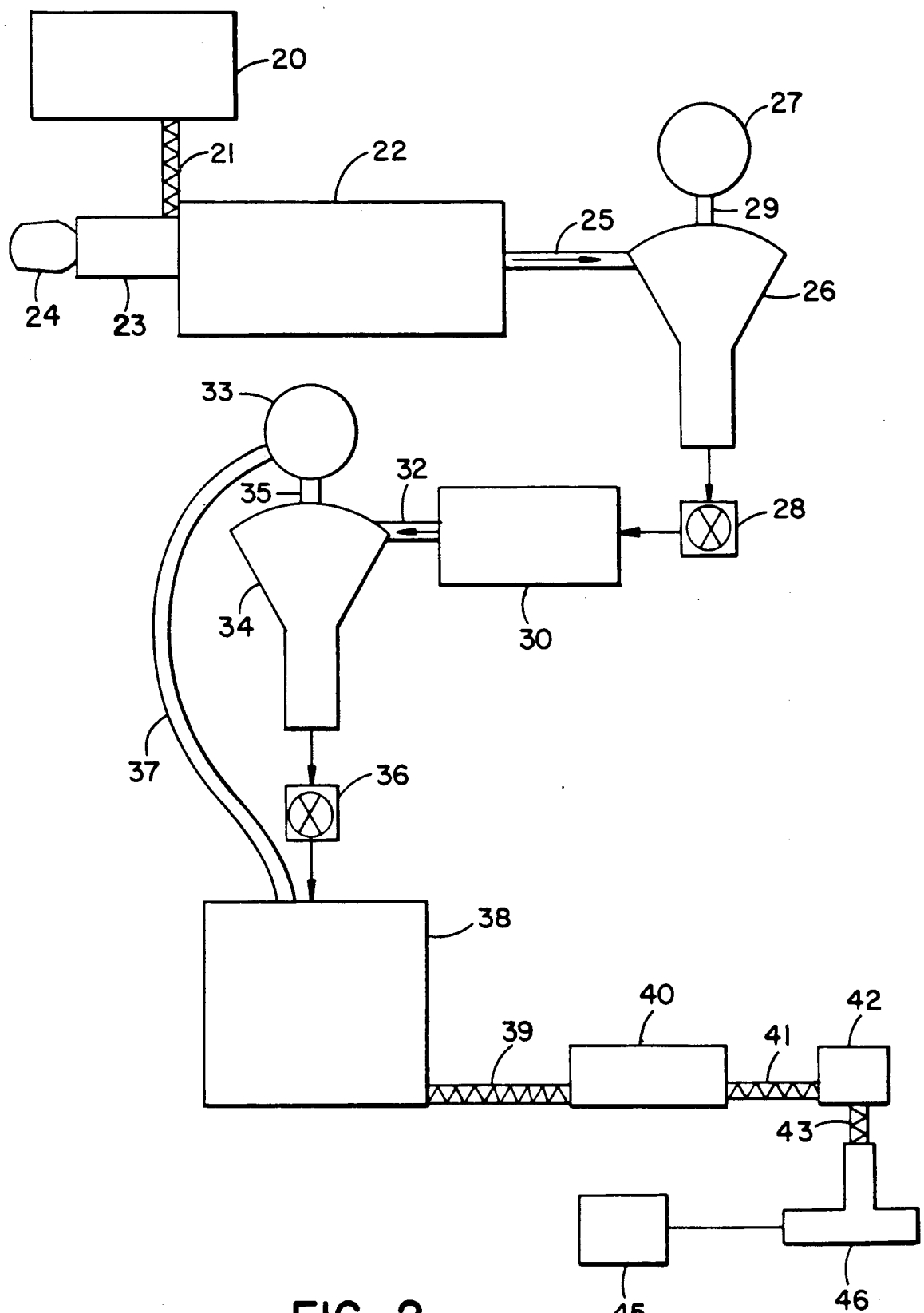
FIG. 2 is a schematic diagram illustrating one embodiment of processing equipment and processing steps useful in the present invention.

FIG. 2 is a schematic diagram illustrating the preferred processing procedure for roughage products which have been cut, chopped, or shredded to produce the desired particle size.

Thus, there is illustrated a feeder 20 in which the cut particles are first placed. The feeder is adapted to uniformly feed the particles into a rotary drum dryer 22 via a screw conveyor 21. The feeder is conventional in design. It includes a moving apron or chain conveyor on a floor which is sloped upwardly. The apron moves a bed of the particles along the floor from the lower end to the upper end. A levelling roller mounted above the floor helps to keep the bed of particles uniform in thickness across the width of the floor. A pick roll at the upper end of the floor distributes the particles into a gathering screw conveyor which is transversely mounted under the upper end of the floor. This conveyor transfers the particles to another screw conveyor 21 to transport the particles to the dryer 22.

The speed of the apron is adjustable to allow for variances in types of particles being processed, and also allows for adjustment of the desired rate of production.

The rotary drum dryer may be, for example, a single pass MED Model 1040 dryer which is 10 feet in diameter and about 40 feet long. The particles enter the front of the drum and are tumbled and mixed with heated air to remove moisture from the particles. The amount of dehydration achieved is dependent upon the moisture content of the entering particles and the temperature maintained inside the dryer. Typical drying temperatures range from about 180° to 290° F., as measured at the back end or output of the drum.

The air is heated in combustion tube 23 by means of burner 24. The combustion tube includes a refractory lined area for the burner to sufficiently heat the air before it enters the dryer. This tube holds the flame from the burner. The burner may be, for example, a panel type flaxon series 66 Airflo Burner System. It is natural has fired and is capable of generating 15 million BTU/hour. The temperature used to dry hay particles should not be greater than about 290° F. in order to avoid affecting palatability of the product.

Typically the particles are in the rotating drum for only a short time (e.g., 1-5 minutes), depending upon the amount of moisture in the particles. Many factors can influence the temperature required to dry the particles, e.g., outside air temperature, humidity, and moisture content. Preferably the particles (e.g., hay) are dried to about 10-12% moisture content in the dryer.

A negative air flow system is used to pull the particles through the dryer to the first or primary cyclone collector 26. Fan 27 is capable of pulling approximately 20,000 cubic feet per minute (CFM) of air through the burner, combustion tube, then through the dryer, and finally through the primary collector. This fan pulls air through, as contrasted with a positive air system where air is pushed from the opposite end. The fan is connected to collector 26 by means of 36 inch diameter tubing 29. A similar size tube 25 is connected between the output of the dryer 22 and the input to the collector 26, as illustrated.

The collector 26 is conventionally available from Kice, as is the fan 27. When the particles have become dried sufficiently in dryer 22, the air carries the dried particles through tube 25 and into collector 26. Then the particles fall to the bottom of the collector where they are permitted to exit the collector through airlock 28. A rotating drum with paddles on its periphery moves the particles out of the collector without introducing any air into the system. Such an airlock is conventionally available from Kice also.

Then the particles may be introduced to a mixer unit 30 (e.g., such as a Sprout-Waldron Model DA40-20), if desired. Alternatively, the particles could proceed directly to secondary collector 34.

If a mixer unit 30 is present it may be used to mix any of a variety of additives with the particles. For example, various conventional preservatives could be added here, such as "Mono-prope" (a granular form of propionic acid commercially available from Anitox Corp). Such preservatives may be added in amounts up to about 0.5% by weight.

Other types of additives which may be added to the particles include food grade oil (e.g., about 2-3% by weight, or molasses (e.g., up to about 20% by weight), etc. It has been found that adding heated molasses (about 90°-100° F.) in an amount of about 5% by weight helps to reduce dust in the final product and improves its texture. It may be sprayed onto the particles in the mixer. The mixer is a continuous, double agitator mixer which is quite effective in mixing and blending the particles with any additives which may be added.

The particles are then drawn from the mixer unit to the secondary collector 34 by means of negative air flow (e.g., 7000 CFM) created by fan 33 (which is commercially available from Kice). This fan has a oapacity to generate or move approximately 14,000 CFM of air, although about 7000 CFM is adequate to lift hay particles from the mixer unit through a 14 inch diameter pipe 32. The secondary collector is commercially available from Kice as Model CK 84. Pipe 35 is also 14 inches in diameter.

The particles are collected in the secondary collector 34 in the same manner as they are collected in the primary collector 26. Airlock 36 located below collector 34 performs the same function as airlock 28 and allows the particles to pass from collector 34 into the cooler/evaporator unit 38.

Fan 33 is also adapted to pull air through the cooler unit 38 by means of a 14 inch pipe 37 to cool the particles to room temperature or below. Some cooling of the particles does occur when the particles are moved by air from the mixer unit to the collector 34. However, additional cooling is necessary before the particles can be safely packaged.

Figure 3:
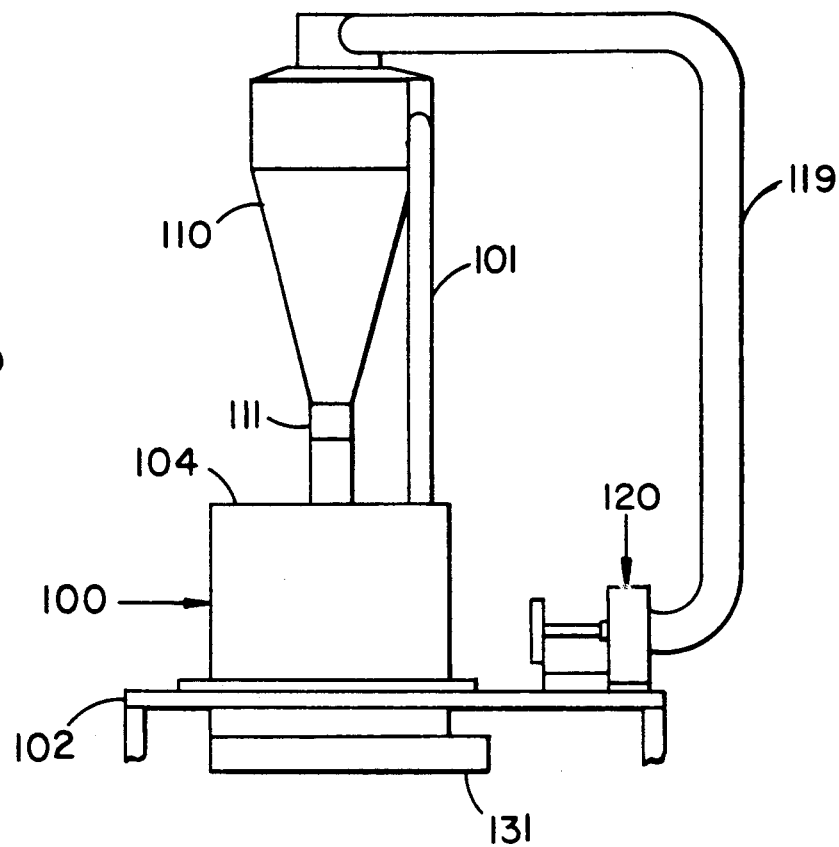
FIG. 3 is a side elevational view of a preferred type of cooler apparatus which is useful in this invention.
Figure 3A:
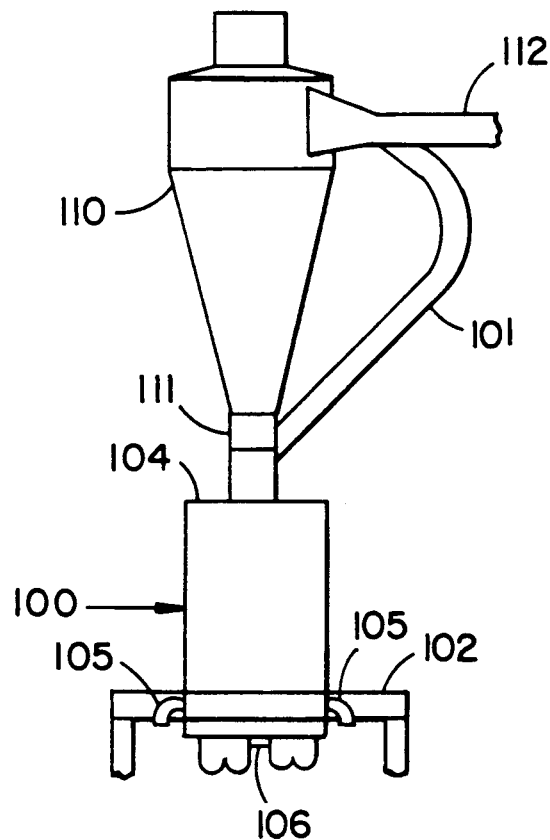
FIG. 3A is an end elevational view of the apparatus shown in FIG. 3.
Figure 4:
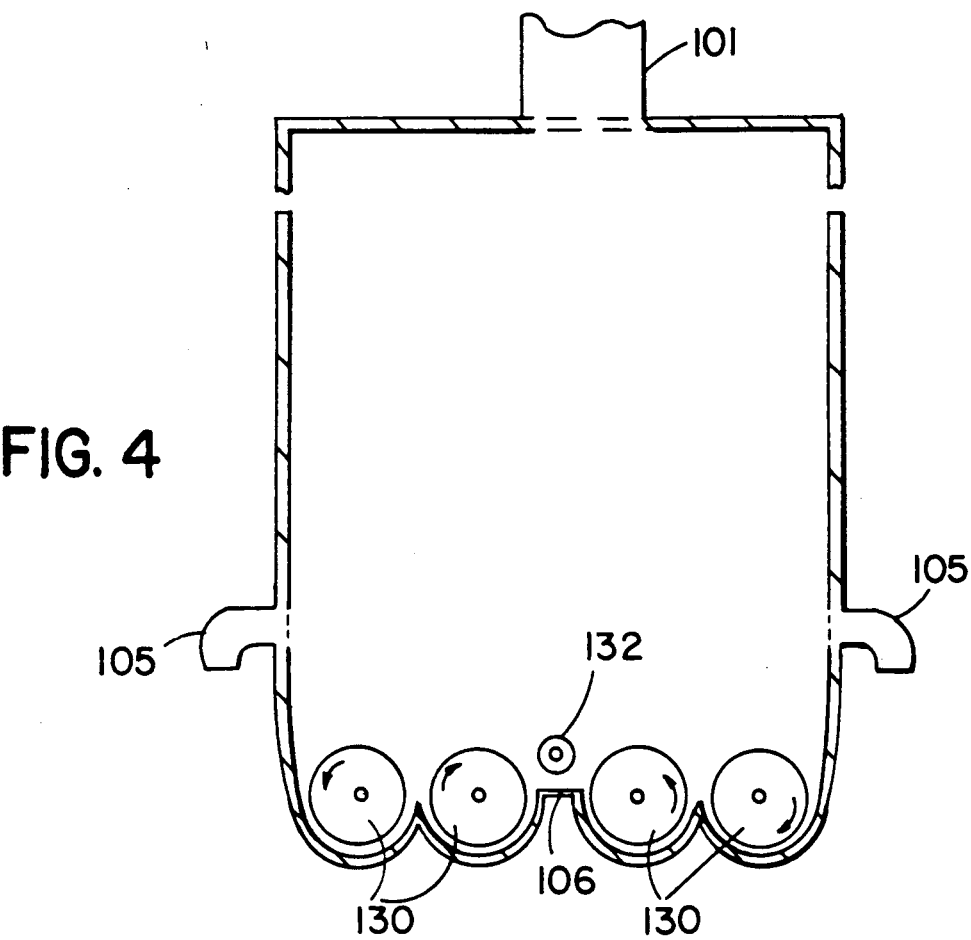
FIG. 4 is a cross-sectional view of the apparatus shown in FIG. 3.
Figure 4A:
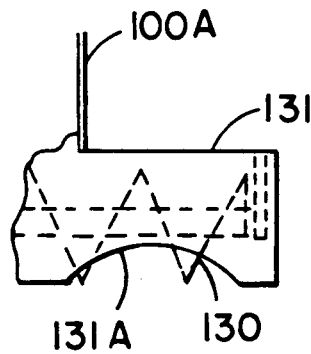
FIG. 4A is a side elevational view illustrating the manner in which dried and cooled product exits the apparatus of FIG. 3.

The cooler unit preferred for use herein is the subject of a pending application entitled "Cooling Apparatus" filed concurrently in the name of Raymond E. Bert, incorporated herein by reference. The cooler unit is depicted in FIGS. 3, 4 and 4A herein and is described in more detail hereafter.

The particles are allowed to remain in the cooler unit for a few minutes (e.g., 10-15) while fresh air is drawn through the unit (e.g., at the rate of about 7000 CFM). The ambient air which is drawn through the unit absorbs moisture from the particles and dries them. This evaporation of moisture from the particles causes them to be cooled. As an example, particles entering the cooler unit having a moisture content of 12% can normally be dried to 8-9% in a few minutes. This also cools the particles to ambient temperature or below. The moisture content of the particles may be reduced as much as 5% or more during the cooling cycle, and the evaporation of moisture can cool the particles as much as 15° F. below ambient or room temperature. If the incoming air is high in humidity it obviously will not dry the particles as quickly as if the air was very dry.

The temperature at the top of the cooler unit is the warmest while the temperature at the bottom is the coolest. Ambient air enters the cooler unit through vents at the bottom, then is drawn upwardly through and around the particles in the unit, and finally is drawn out the top of the unit through pipe 37 which may be 14 inches in diameter, for example. The pipe may be dampered to allow for adjustments in amount of air flow desired.

The size of the cooler unit may vary, as desired, to accommodate various amounts of particles. A large unit may hold as much as 2 tons of chopped hay, for example. During normal production levels this allows for approximately 20 minutes of retention time inside the unit.

It is extremely important to have the particles cooled to ambient air temperature or below before the particles are packaged in an air-tight container so that condensation of moisture does not occur in the package. If condensation does occur it can quickly cause the product to spoil or become unpalatable to animals.

A plurality of augers at the base of the cooler unit rotate in a manner such that the particles are moved toward one end of the unit where they can exit the unit. The dried particles then proceed via a screw conveyor 39 to a metering bin 40. Indicators in this bin are used to selectively start and stop conveyor 39 in a manner such that a certain amount of dried particles are always present in bin 40 and ready for weighing and packaging. For example, the bin may be adapted to hold 300-400 pounds of dried product at all times.

At the bottom of bin 40 there are a plurality of augers 41 which convey dried product to the scale 42. The scale can be, for example, a hinged bottom bin which sits on top of three strain gauge load cells. The load cells send a signal to a computer controlled electronic scale (commercially available from Masstron as Model M5000). Until the signal received by the scale reaches a predetermined weight value, the computer continues to cause the augers to operate and convey additional dried particles to the bin. When the pre-set weight is present in the bin the augers are stopped automatically. Then the scale's hinged bottom is opened to allow the dried particles to exit and fall into four 10 inch diameter augers 43 which transport the particles to the baling or packaging apparatus 44. The computer then receives a signal that the scale bin is empty and the loading cycle begins again. After the bale or package is produced it is sealed at station 45.

Figure 5A:
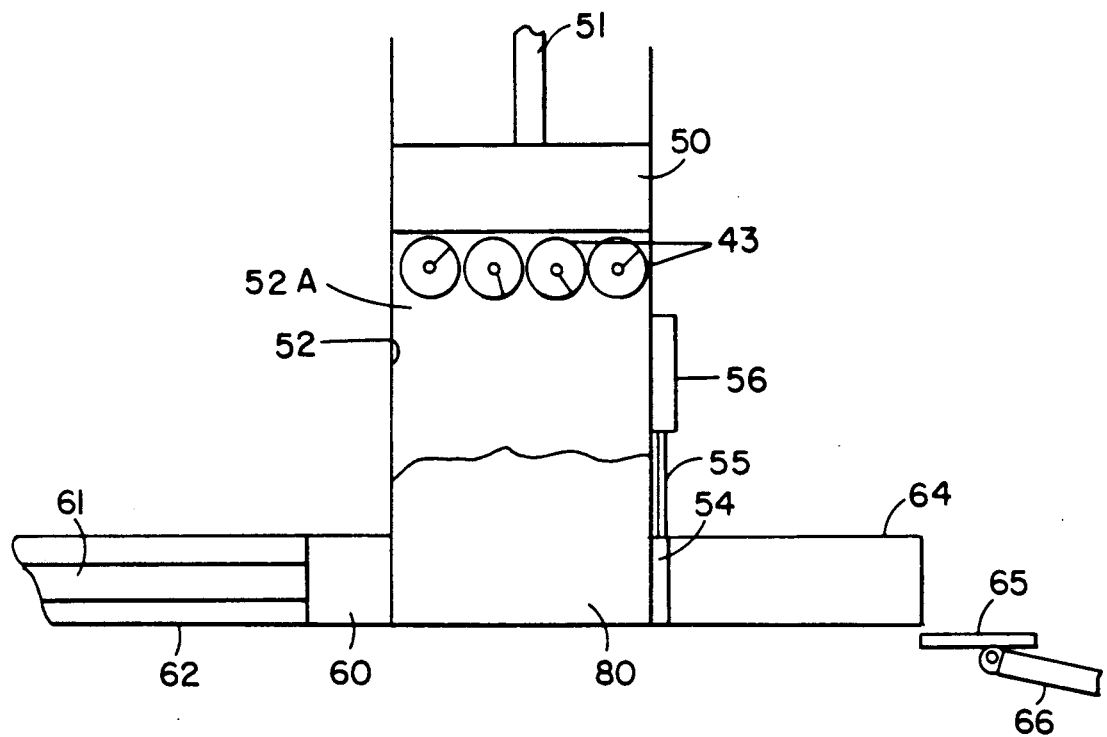
FIGS. 5 A, B, C, D illustrate the compression and packaging of the dried and cooled product.

The baling or packaging process and equipment used are illustrated in FIGS. 5A, B, C and D. These are elevational cutaway views. In FIG. 5A there are illustrated a vertical press 50 and a horizontal press 60. Press 50 moves up and down in chamber 52 by means of hydraulically-powered ram 51. In the back wall 52A of chamber 52 one can see the ends of augers 43 which auger the dried particles 80 from the scale to the chamber 52.

Press 60 moves horizontally within chamber 62 and is powered by hydraulic ram 61. Gate member 54 attached to the end of ram 55 powered by hydraulic cylinder 56 is movable vertically between open and closed positions. In FIG. 5A the gate member 54 is in its downward or closed position to close the bottom of chamber 52 on one side. Horizontal press 60 is positioned flush with the opposite wall of chamber 52 as illustrated.

Figure 5B:
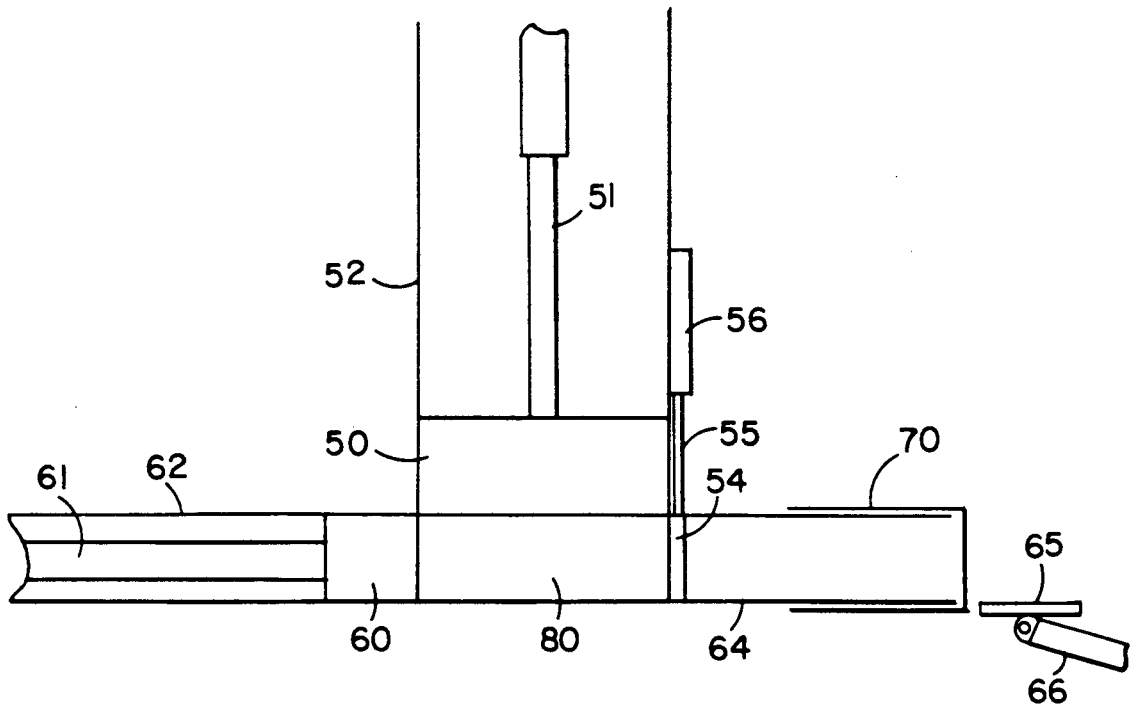

After the dried particles 80 are augered into chamber 52 by means of augers 43, press 50 is urged downwardly in the chamber to compress the particles. This is illustrated in FIG. 5B. The compressed particles 80 are shown within chamber 52 under press 50. A plastic bag 70 or other desired container is then positioned over the open end of exit chamber 64.

Figure 5C:
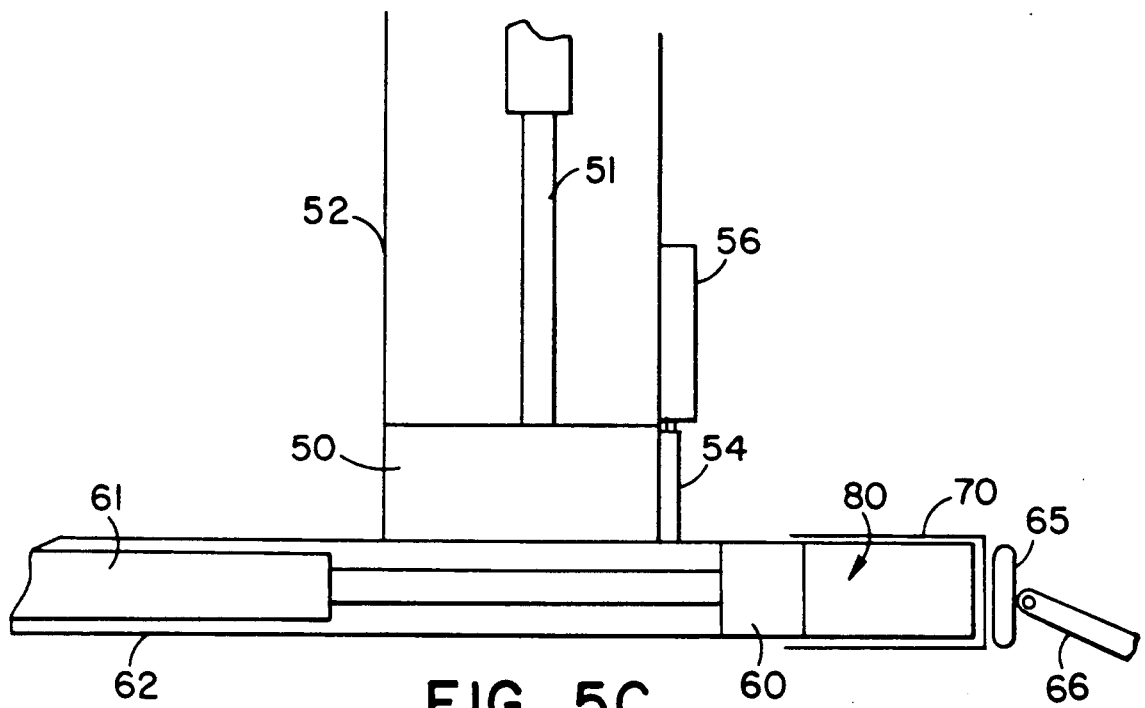
Figure 5D:
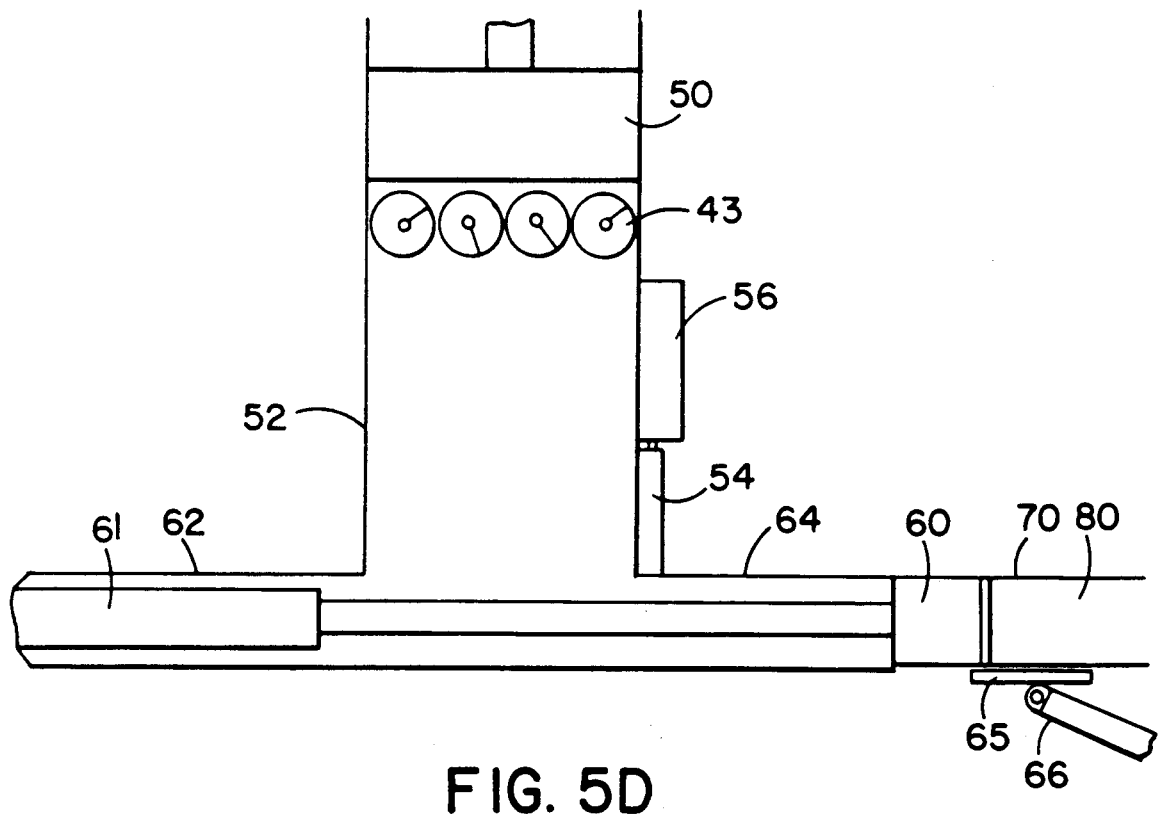

Then horizontal press 60 is extended and forced against the particles 80 for final compression of the product in the chamber. After a 3-5 second dwell time with about 3000 psi pressure being exerted), the door member 54 is then opened. In FIG. 5C door member 54 has been raised upwardly so as to enable compressed particles 80 to be moved into exit chamber 64 by means of press 60. This forces the compressed particles 80 into the plastic bag 70. Door or stop member 65 (which is pivoted on the end of cylinder 66) is positioned behind the closed end of the bag 70 while the compressed particles are urged into the bag. Then press 50 is raised to its upward position and door member 65 is moved away from the closed end of bag 70. Then press 60 is extended further to move the filled bag off from chamber 64 as illustrated in FIG. 5D. The packaged product is then moved to a sealing station where a heated platen is used to seal the flaps of the plastic bag in a closed position. For example, a 5 inch by 6 inch waffle shaped metal plate (heated to about 350°-450° F.) is urged against the folded flaps of the bag for 1-2 seconds. The temperatures of the platen, and the contact time, may be varied as necessary or desired.

The amount of compression of the dried particles in the package may vary. When packaging hay particles it is preferred to compress them until the density is at least about 18 pounds per cubic foot. Even more preferably, the density of such product is at least 20-22 pounds per cubic foot. Even greater densities are possible, if desired, e.g., 30 pounds per cubic foot.

The type of container used to package the compressed product may vary. A plastic bag (e.g., polyethylene having a thickness of about 0.005 inch) is very useful. This type of container is preferred because it is essentially air impervious. Accordingly, the product can be protected from moisture in the environment during shipment and storage. Other types of containers, of course, could also be used. They may be air impervious or not. The size of the container may also vary, depending upon the amount of weight which is desired in the container.

The preferred cooling unit for use in this invention is shown in FIGS. 3, 3A, 4 and 4A. Thus, in FIGS. 3 and 3A there is shown a cooling bin 100 which is supported on support structure 102. A cutaway end view is shown in FIG. 4. Particles to be dried are dropped in through the roof 104 of the bin. For example, the particles may be fed in from cyclone collector 110 through conventional airlock 111. The particles may be pulled into collector 110 through pipe 112 from a dryer or mixer, for example.

Fan unit 120 creates a negative air flow system in which air moves toward the fan through pipes 112, 101, and 119. This draws air up through the cooler unit 100. Vent members 105 at the sides of the cooling unit and vent 106 at the bottom of the unit allow outside air to be pulled into the unit. As the air moves through the unit is passes through and around the particles in the unit and absorbs moisture from the particles.

At the bottom of the unit 100 there are a plurality of augers 130 which are horizontally disposed and which extend along the entire length of the unit. Preferably they also extend past one end wall 100A the unit as illustrated in FIG. 4A where the augers are surrounded by enclosure 131. Openings 131A on the underside allow the dried and cooled particles to exit the cooler unit. A conveyor may be positioned under the openings 131A to convey the particles to any desired location.

Augers 130 are rotated in a manner such that the particles are moved toward the exit end of the unit. Preferably small auger 132 extends along the length of the unit above the augers 130 as illustrated in order to prevent bridging of the particles between the walls of the unit when the particles settle in the housing (i.e., as the augers remove particles from the bottom of the housing).

The amount of air flow through the unit may vary. A conventional fan unit may be used. In the system illustrated herein the fan unit is capable of drawing about 7000 CFM through the cooling unit. Dampers may be included to vary and adjust the amount of air flow through the unit. Similarly, additional vents may be included, if desired.

The size and number of augers at the base of the unit may also vary. Also the speed of rotation of the augers may also vary so long as the particles are sufficiently cooled by the time that they exit the unit.

Other variants are possible without departing from the scope of the present invention. For example, if desired, the packaging of the dried and cooled particles may be performed in a nitrogen atmosphere or under a nitrogen blanket to reduce the amount of air present in the final packaged product.

When packaging hay products it is preferred to reduce the moisture content of the particles to about 8 to 12%. The most preferred moisture content is about 9.5 to 10.5%. If the moisture content is less than about 8% it is difficult to obtain the desired amount of compaction in the package, brittleness of the product increases, and more dust may be created. If the moisture content is over about 12% there is the danger of product spoilage during shipment and storage.

The permissible amount of moisture content may vary with respect to other types of materials which are desired to be packaged. Some materials may require lower moisture content levels in order to avoid spoilage on storage. Mixtures of materials may also be packaged (e.g., specially blended feed formulations).

The particles size of the products to be packaged may vary widely. The particles could be ground to a fine powder if that is desired. For roughage products it is desirable to maintain a long stem for the product. For example, for hay it is preferred to have particles as long as 3 inches or even more. The size of the processing equipment may limit the length of the material which can be processed and packaged. Also, if the particles are too long they do not compact as easily during packaging.

Although it is not necessary to seal the package in an airtight manner, this is preferred. Thus, when the package is sealed the product is prevented from absorbing moisture and spoiling. Also, the moisture present in the package is prevented from escaping in dry environments. This is very important in protecting palatability and avoiding dust.

For processing and packaging of hay products it is preferred to start with fresh cut hay. However, the techniques of the invention are equally applicable to hay which has already been conventionally baled. In such event, the bales are opened and the hay is cut to the proper length, after which it is processed and packaged as described.

The processing and packaging techniques described herein provide a preserved product which retains its desirable characteristics even after prolonged storage. This has not heretofore been described or provided by other.

What is claimed is:

1. A process for packaging alfalfa hay consisting essentially of the steps of:
    (a) cutting said hay at a moisture content in the range of about 25–50% to produce a particle size of a length less than six inches;
    (b) drying said hay particles to a moisture content less than 12%;
    (c) cooling said hay particles to approximately room temperature;
    (d) placing said hay particles into a container impervious to air in a manner such that said particles in said container have a bulk density of at least about 15 pounds per cubic foot; and
    (e) closing said container; wherein said hay particles retain their natural roughage characteristics, nutritional value, and palatability.

2. A process in accordance with claim 1, wherein said container comprises a plastic bag.

3. A process in accordance with claim 1, wherein said hay particles are dried at a temperature in the range of about 180° to 280° F.

4. A process in accordance with claim 1, wherein said hay particles have a length less than about 3 inches.

5. A process in accordance with claim 1, wherein said hay particles are dried to a moisture content in the range of about 8 to 10%.

6. A process in accordance with claim 1, wherein said hay particles are packed in said container at a density of 20 to 30 pounds per cubic foot.

7. A process in accordance with claim 1, further comprising the step of adding molasses to said hay particles after said particles are dried.

8. A process in accordance with claim 1, further comprising the step of adding a preservative to said hay particles after said particles are dried.

9. A process in accordance with claim 1, wherein said hay particles are mixed to form a uniform blend prior to being packed in said container.

10. A process for packaging alfalfa or clover feedstuff consisting essentially of the steps of:
    (a) reducing the particle size of said feedstuff to produce particles having a length less than 6 inches;
    (b) drying said particles to a moisture content less than 12%;
    (c) cooling said particles to approximately room temperature;
    (d) placing said particles into a container impervious to air in a manner such that said particles in said container have a density of at least 15 pounds per cubic foot; and
    (e) closing said container; wherein said particles retain their natural roughage characteristics, nutritional value, and palatability, and wherein said alfalfa or clover feedstuff has an initial moisture content in the range of about 25 to 50%.

11. A process in accordance with claim 10, wherein said container comprises a plastic bag.

* * * * *